United States Patent
Rump et al.

(10) Patent No.: US 9,346,564 B1
(45) Date of Patent: May 24, 2016

(54) SYSTEM AND METHOD FOR MANUALLY SAFING AND DEORBITING A GEOSTATIONARY SPACECRAFT IN AN ABSENCE OF A SPACECRAFT PROCESSOR

(71) Applicant: The Boeing Company, Chicago, IL (US)

(72) Inventors: Kurt M. Rump, El Segundo, CA (US); Richard A. Noyola, Redondo Beach, CA (US); Steven E. Ardito, Calabasas, CA (US); Adriel O. Carreno, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 13/898,421

(22) Filed: May 20, 2013

Related U.S. Application Data

(60) Provisional application No. 61/761,160, filed on Feb. 5, 2013.

(51) Int. Cl.
*B64G 1/10* (2006.01)
*B64G 1/24* (2006.01)

(52) U.S. Cl.
CPC .................................. *B64G 1/242* (2013.01)

(58) Field of Classification Search
CPC ........ G05D 1/0866; B64G 1/242; B64G 1/24; B64G 1/36
See application file for complete search history.

(56) References Cited

U.S. PATENT DOCUMENTS

| | | | | |
|---|---|---|---|---|
| 5,938,703 | A * | 8/1999 | Zwang | B64G 1/22 244/158.8 |
| 6,186,446 | B1 * | 2/2001 | Tilley | B64G 1/007 244/164 |
| 6,776,372 | B2 | 8/2004 | Salvatore et al. | |
| 7,093,800 | B2 | 8/2006 | Salvatore et al. | |
| 7,410,130 | B2 * | 8/2008 | Wang | G05D 1/0883 244/164 |
| 7,546,983 | B2 * | 6/2009 | Wang | B64G 1/281 244/164 |
| 7,665,695 | B2 * | 2/2010 | Wang | B64G 1/281 244/164 |
| 2005/0133670 | A1 * | 6/2005 | Wang | B64G 1/288 244/170 |

* cited by examiner

*Primary Examiner* — Philip J Bonzell
(74) *Attorney, Agent, or Firm* — McDonnell Boehnen Hulbert & Berghoff LLP

(57) ABSTRACT

A system and method for controlling de-orbit of a spacecraft is presented. Embedded command modules are commanded directly from a central command and telemetry module. Latch valves, thruster valves, and solar wing drive of the spacecraft are operated in response to inputs to the embedded command modules. The spacecraft is maneuvered to a safe disposal orbit in response to commands from the central command and telemetry unit.

20 Claims, 14 Drawing Sheets

EXISTING ART

SYSTEM AND METHOD FOR MANUALLY SAFING AND DEORBITING A GEOSTATIONARY SPACECRAFT IN AN ABSENCE OF A SPACECRAFT PROCESSOR

CROSS-REFERENCE TO RELATED APPLICATION

This application claims the benefit of U.S. Provisional Patent Application Ser. No. 61/761,160, filed on 5 Feb. 2013, the content of which is incorporated herein by reference in its entirety.

FIELD

Embodiments of the present disclosure relate generally to maneuvering a satellite. More particularly, embodiments of the present disclosure relate to systems for manually de-orbiting a geosynchronous satellite.

BACKGROUND

Spacecraft include one or more on-board computer processors to control functionality including steering, acceleration, de-acceleration, and other navigation components thereon. In an event of a spacecraft incident, for example, an intermittent event, e.g., overheating, or complete failure, e.g., short or open circuit, of one or more computer processors on-board, there may be an insufficient control available for the spacecraft to safely de-orbit. De-orbiting may comprise, for example but without limitation, increasing an orbit altitude, decreasing an orbit altitude, moving to a new safe orbit, leaving orbit or other suitable action or maneuver. De-orbiting a geosynchronous spacecraft is an important operation as the orbit slot is a valuable resource that can then be made available for a replacement spacecraft.

SUMMARY

A system and method for controlling de-orbit of a spacecraft is presented. Embedded command modules are commanded directly from a central command and telemetry module. Latch valves, thruster valves, and solar wing drives of the spacecraft are operated in response to inputs to the embedded command modules. The spacecraft is maneuvered to a safe disposal orbit in response to commands from the central command and telemetry unit.

In this manner, embodiments of the disclosure provide the system and method that provide an alternative means of maneuvering the spacecraft, e.g., to de-orbit to a safe disposal orbit, in event of a spacecraft failure, such as a failure of one or more central processor systems. The system and method provide a means for manually safing and deorbiting a geostationary spacecraft in an absence of a spacecraft processor.

In an embodiment, a method for controlling de-orbit of a spacecraft commands embedded command modules directly from a central command and telemetry module. The method further operates latch valves, thruster valves, and a solar wing drive of the spacecraft in response to inputs to the embedded command modules. The method further maneuvers the spacecraft to a safe disposal orbit in response to commands from the central command and telemetry unit.

In another embodiment, a system for controlling de-orbit of a spacecraft comprises embedded command modules and spacecraft devices. The embedded command modules are commanded directly from a central command and telemetry unit. The spacecraft devices comprise latch valves, thruster valves, and a solar wing drive of the spacecraft responsive to inputs from the embedded command modules.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to satellite systems, communication systems, network protocols, global positioning systems, cloud computing, and other functional aspects of the systems (and the individual operating components of the systems) may not be described in detail herein.

Embodiments of the disclosure are described in the context of a non-limiting application, namely, a geosynchronous spacecraft system for a de-orbiting application. Embodiments of the disclosure, however, are not limited, and the techniques described herein may also be utilized in other applications requiring de-orbiting. For example, embodiments may be applicable to any other type of special or general purpose computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Figure 1:
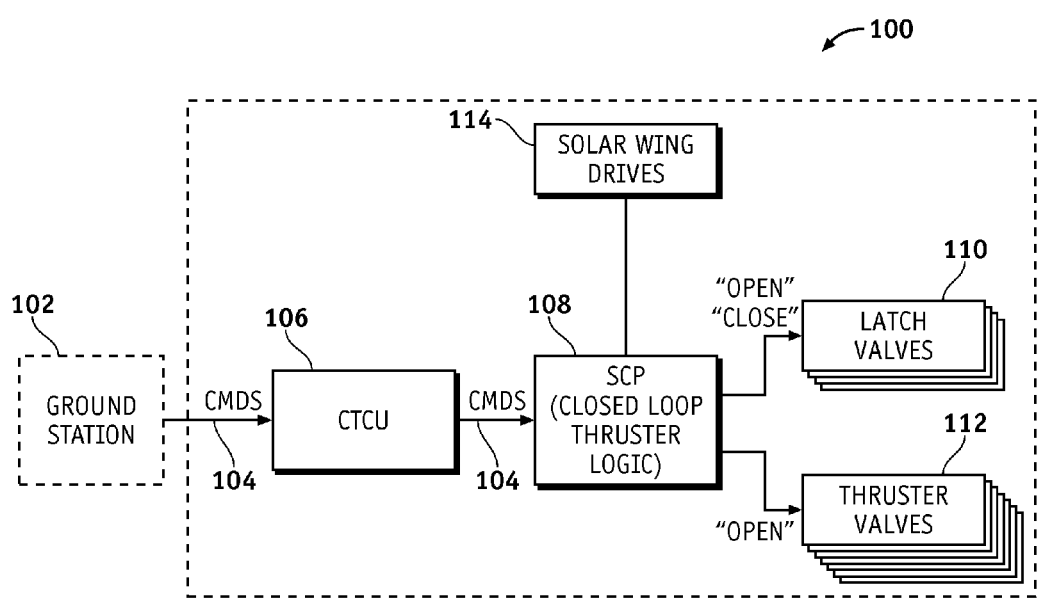
FIG. 1 is an illustration of an existing art system to control spacecraft latch valves and thrusters.

FIG. 1 is an illustration of an existing art system 100 to control spacecraft latch valves 110 and thruster valves 112. A Central Command and Telemetry Unit (CTCU) 106 may receive ground initiated commands 104 form a ground-based control center 102 (ground station). A Spacecraft Control Processor (SCP) 108, which may comprise a closed loop thruster logic, receives the ground initiated commands 104 from the Central Command and Telemetry Unit (CTCU) 106 and controls the latch valves 110, thruster valves 112, and Solar Wing Drives 114 based on the ground initiated commands 104 received from the Central Command and Telemetry Unit (CTCU) 106.

Generally current spacecraft can accommodate only a single Spacecraft Control Processor (SCP) 108 failure. Since generally the thruster valves 112 and Solar Wing Drives (SWD) 114 are only commanded through the Spacecraft Control Processor (SCP) 108, failure of both primary and redundant Spacecraft Control Processors (SCP) 108 generally prevent commanding the thruster valves 112 needed to control attitude and raise an orbit to a disposal altitude, or commanding the Solar Wing Drives 114 needed to point the Solar Wings at the sun to provide the spacecraft with power. Recently, operators have requested that an ability to place a spacecraft in a disposal orbit in an event of a dual Spacecraft Control Processor (SCP) 108 failure be added to new spacecraft.

On several recent spacecraft, some systems have provided a capability using an addition of a third spacecraft processor; however, inclusion of the third spacecraft processor also adds significant cost. Use of a "processor-less" method according to embodiments of the disclosure allow a de-orbit capability to be provided for a lower cost than the addition of the third spacecraft processor.

Figure 2:
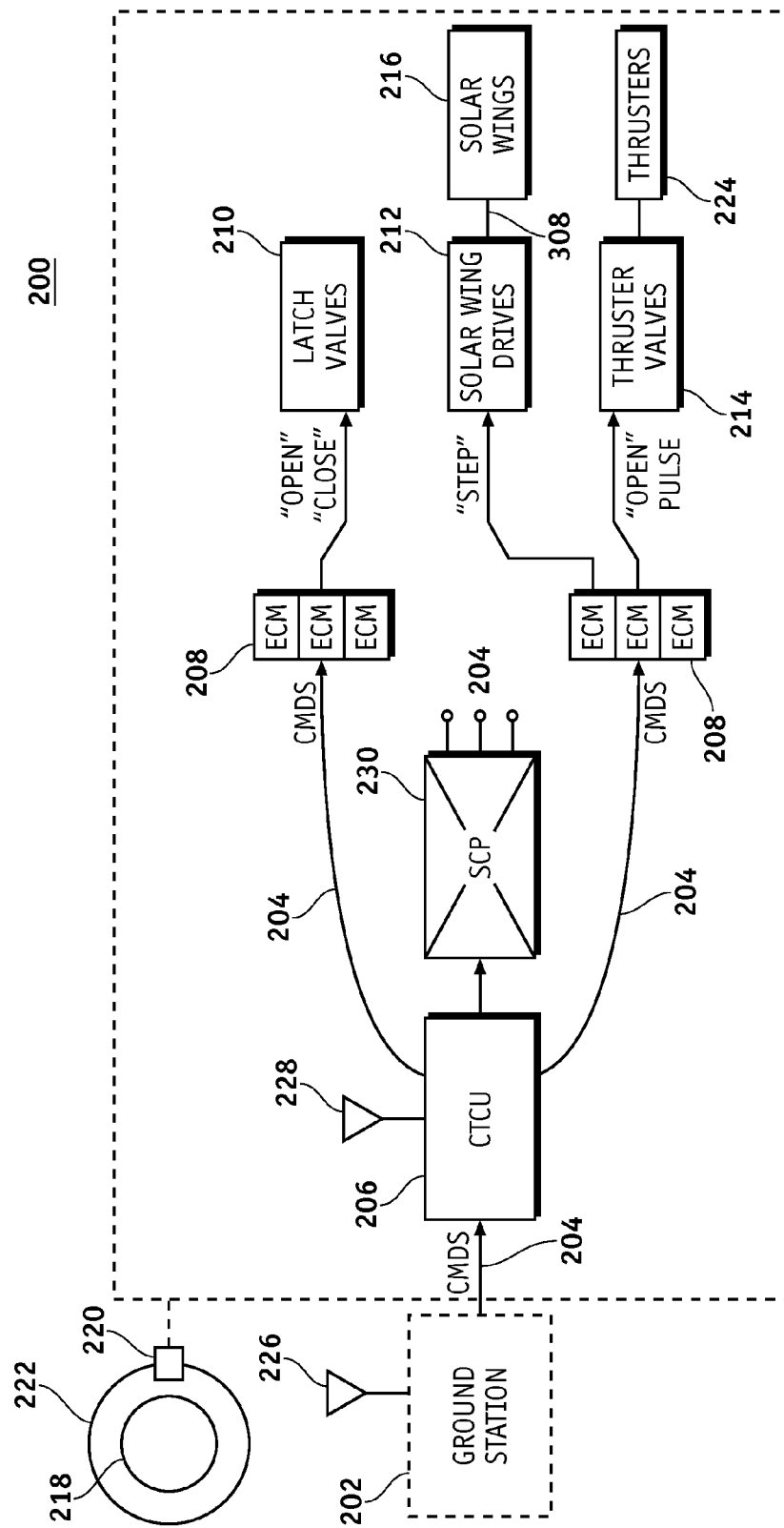
FIG. 2 is an illustration of an exemplary processor-less spacecraft de-orbiting system that allows the Spacecraft Control Processor (SCP) to be bypassed by introducing Embedded Command Modules (ECMs) to actuate the latch valves, thrusters, and other components of the spacecraft according to an embodiment of the disclosure.

FIG. 2 is an illustration of an exemplary processor-less spacecraft de-orbiting system 200 (system 200) that allows a Spacecraft Control Processor (SCP) 230 (108 in FIG. 1) to be bypassed by introducing Embedded Command Modules (ECMs) 208 to actuate latch valves 210, Solar Wing Drives 212, thruster valves 214, and other components of an spacecraft 220 according to an embodiment of the disclosure. The system 200 comprises the Central Command and Telemetry Unit (CTCU) 206, the Embedded Command Modules (ECMs) 208, the latch valves 210, the Solar Wing Drives 212, and the thruster valves 214.

The Central Command and Telemetry Unit (CTCU) 206 is configured to command the Embedded Command Modules (ECMs) 208.

The Embedded Command Modules (ECMs) 208 are configured to be commanded directly from the Central Command and Telemetry Unit (CTCU) 206 via ground control commands 204 received from a ground-based control center 202. The Embedded Command Modules 208 that can be directly commanded from the Central Command and Telemetry Unit (CTCU) 206 are added to the spacecraft 220 to provide an alternative source of the ground control commands 204 otherwise generated by the Spacecraft Control Processor (SCP) 108 (FIG. 1). This allows manual ground commanding of the latch valves 210, the Solar Wing Drives 212, and the thruster valves 214 through the Central Command and Telemetry Unit (CTCU) 206, even in an event that both primary and redundant the Spacecraft Control Processors (SCP) 108/230 are no longer operational. The Embedded Command Modules (ECMs) 208 are operable and configured to command a solar wing drive to move at least one solar wing to a peak power orientation. As used herein, manual and manually may mean, for example without limitation, using commands sent from an external source to a spacecraft such as the ground control commands 204 from the ground-based control center 202.

The ground control commands 204 may comprise pulse commands that can operate the latch valves 210, the thruster valves 214, and the Solar Wing Drives 212. After ground commands are sent to remove power from reaction wheels, which are then allowed to spin down, manually ground commanded pulsing of axial roll thrusters of the thrusters 224 are used to place the spacecraft 220 in a stable spin about a major axis of inertia of the spacecraft 220 (e.g., X-axis).

The latch valves 210, which allow propellant to flow to the thrusters 224, are configured to latch in response to the ground control commands 204 from the ground-based control center 202 via the Central Command and Telemetry Unit (CTCU) 206 and the Embedded Command Modules 208.

The Solar Wing Drives 212 are configured to control solar wings 216. For example but without limitation, the Solar Wing Drives 212 control the rotation angle of the solar wings 216 relative to a main body of the spacecraft 220.

The thruster valves 214 are configured to control the thrusters 224. The thrusters 224 may comprise, for example but without limitation, axial thrusters, sun pointed thrusters, or other thrusters.

Embodiments of the disclosure use sun pointed orbit raising maneuvers (e.g., thruster firings to increase orbital altitude), which result in an out-of-plane delta-V component (1002 FIG. 11) which is a function of sun declination (e.g., season). Thereby, orbit raising firings are sun pointed, and a significant orbit inclination increase may be observed if the orbit raising maneuvers (1004 FIG. 11) are performed near solstice. Evaluation of routinely available North American Aerospace Defense Command (NORAD) two-line orbit elements (e.g., Right Ascension of the Ascending Node and inclination) for a satellite being raised to a disposal orbit would indicate sun pointed delta-V firing is being performed, as long as such maneuvers are not being performed near a time of an equinox.

Figure 3:
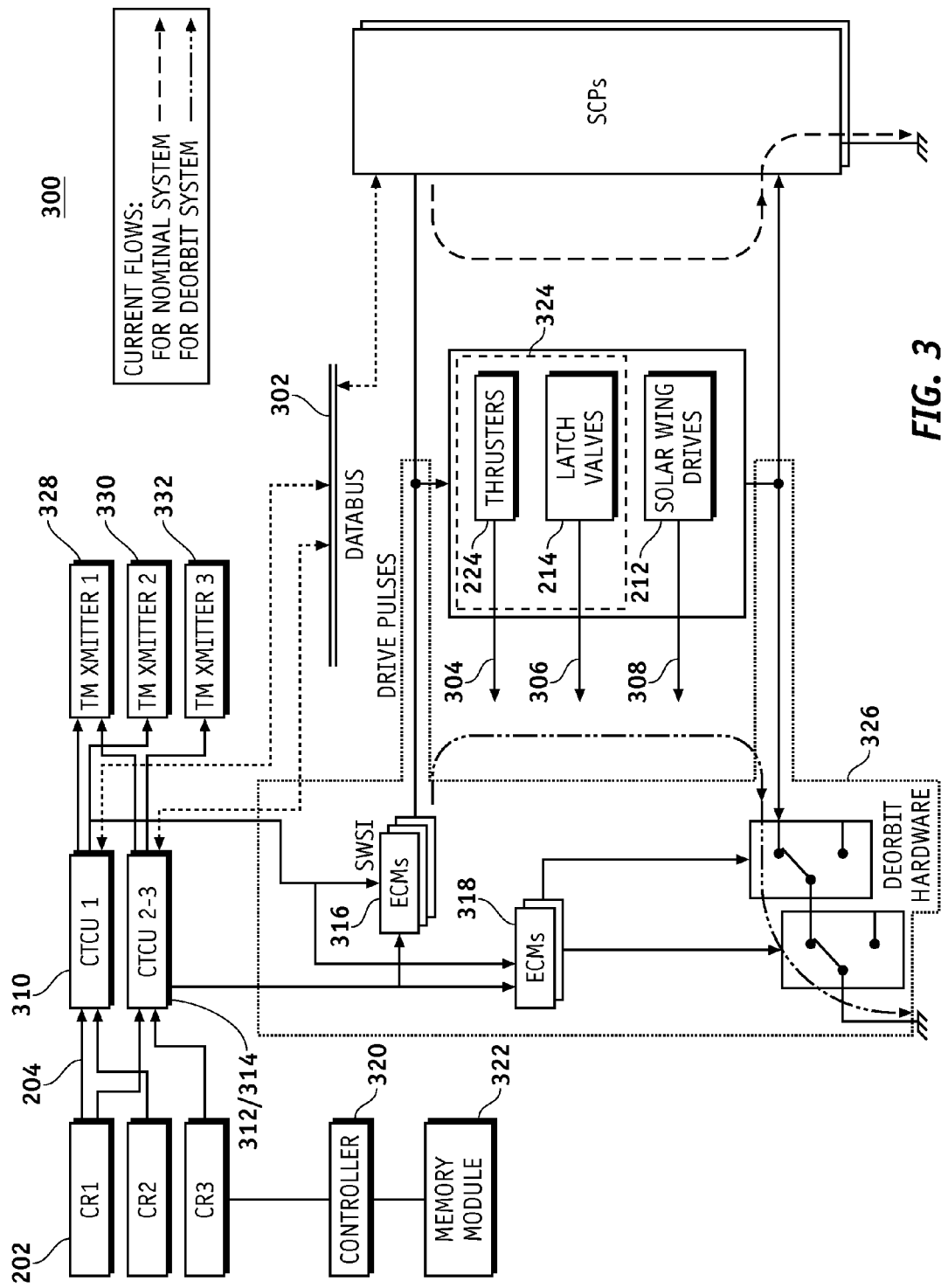
FIG. 3 is an illustration of a schematic block diagram of a processor-less spacecraft de-orbiting system according to an embodiment of the disclosure.

FIG. 3 is an illustration of a schematic block diagram of a processor-less spacecraft de-orbiting system 300 according to an embodiment of the disclosure. Systems 300 may have functions, material, and structures that are similar to the embodiments shown in FIG. 2. Therefore common features, functions, and elements may not be redundantly described here. The system 300 may comprise the ground-based control centers (CR1-CR3) 202 comprising a controller 320, and a memory module 322, Central Command and Telemetry Units (CTCU1-CTCU3) 310/312/314, and Embedded Command Modules (ECMs) 316/318.

The ground-based control center 202 generates the ground control commands 204 to perform all payload shutdown and de-orbit functions. A third Central Command and Telemetry Unit (CTCU) 314 dedicated to payload shutdown and de-orbit functions may be added to a usual two Central Command and Telemetry Units (CTCUs) 310/312. Additional Embedded Command Modules (ECMs) 316/318 can command firing of Liquid Propulsion System (LPS) 324 and stepping of the Solar Wing Drive (SWD) 212. The system 300 allows ground commanded payload shutdown and configuration of ground command heaters and battery charging to ensure sufficient power is available to operate devices required for deorbit. Additional harness and relays activate the system 300. Propellant quantities sufficient to perform spinup, spin axis reorientation, and orbit change maneuvers is reserved for de-orbit; the amount reserved for a particular spacecraft is dependent on the spacecraft mass and thruster configuration. Further advantages of system 300 may comprise, for example but without limitation, use of currently available, flight-proven hardware (e.g., CTCUs, ECMs, and Relays), very low additional mass, negligible additional power, de-orbit hardware 326 is largely decoupled from primary systems, no significant impact on primary subsystem reliability, and other features.

Figure 5:
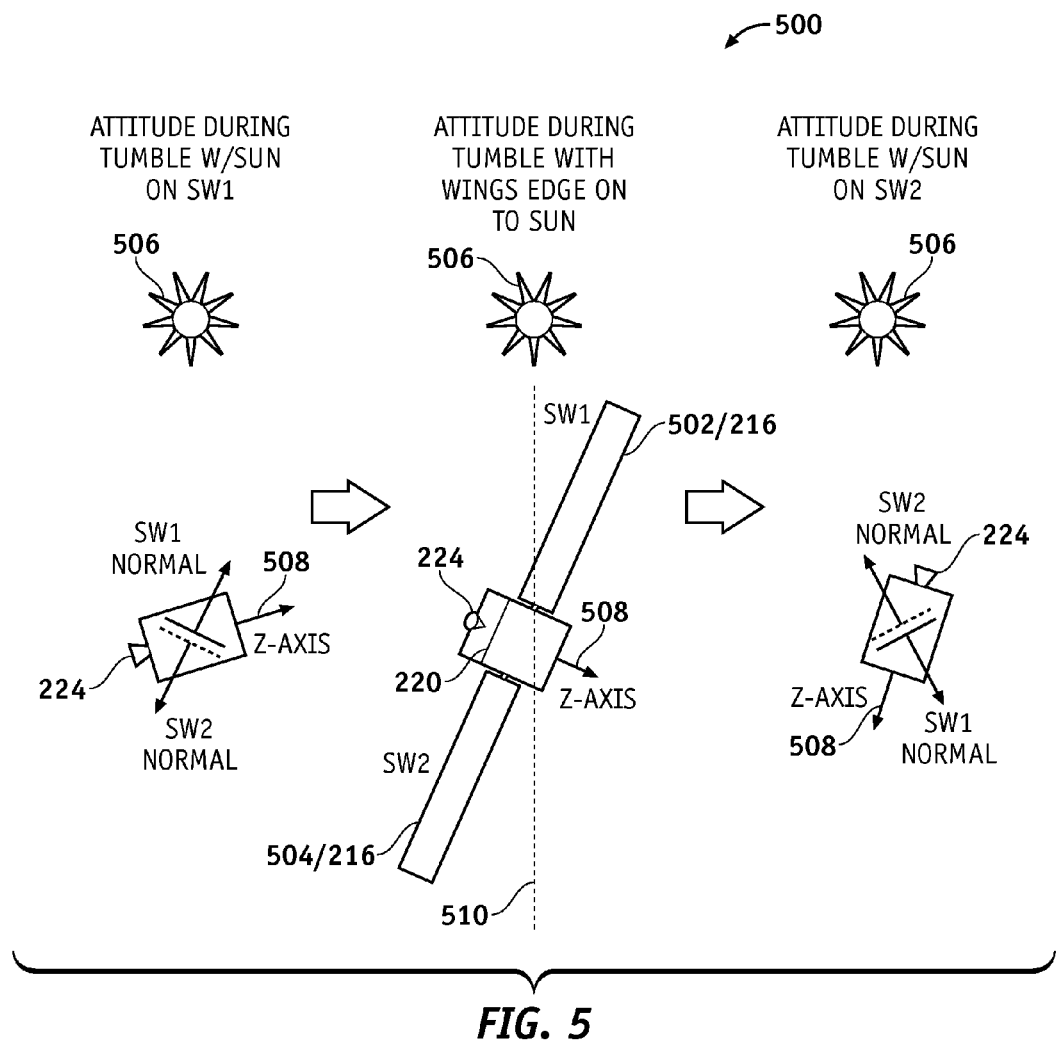
FIG. 5 is an illustration of an exemplary pre-spinup process according to an embodiment of the disclosure.
Figure 11:
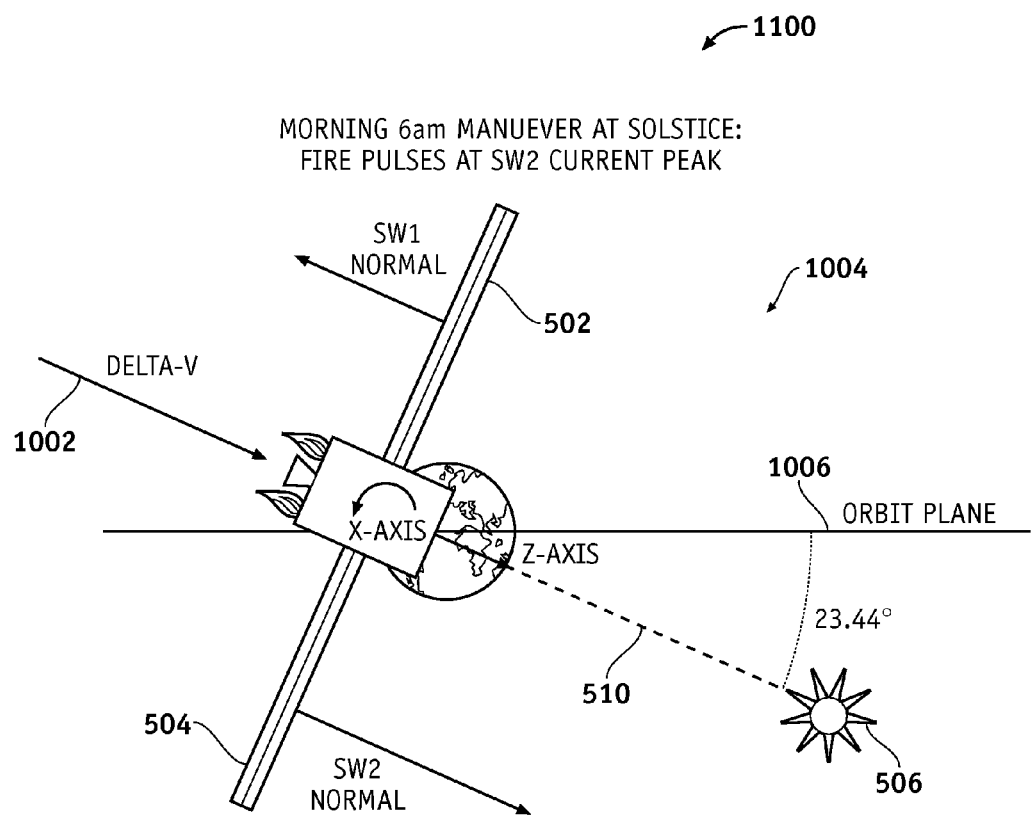
FIG. 11 is an illustration of a morning 6 am maneuver at a solstice according to an embodiment of the disclosure.

Maxima (peaks) in telemetered solar wing current (solar wing current peaks 308) and ground-based control center 202 bookkeeping of commanded solar wing drive steps 306 are used to move the solar wings 216 to a peak power orientation, and to reorient the main body of the spacecraft 220 to an orbit-raising attitude. In the orbit-raising attitude, a spacecraft X-axis 602 (x-spin axis 602, FIG. 6), which comprises both the spacecraft spin axis and major axis of inertia is substantially perpendicular to a sunline 510 as shown in FIG. 11 (sunline 510 is also shown in FIG. 5 in another configuration). This allows axial thrusters of the thrusters 224, which have thrust axes pointed along the Z-axis 508 and therefore perpendicular to the spacecraft X-axis 602, to be used to raise the orbit of the spacecraft 220, during the portion of each spacecraft spin period when the thrusters 224 are parallel to the sunline 510.

Figure 8:
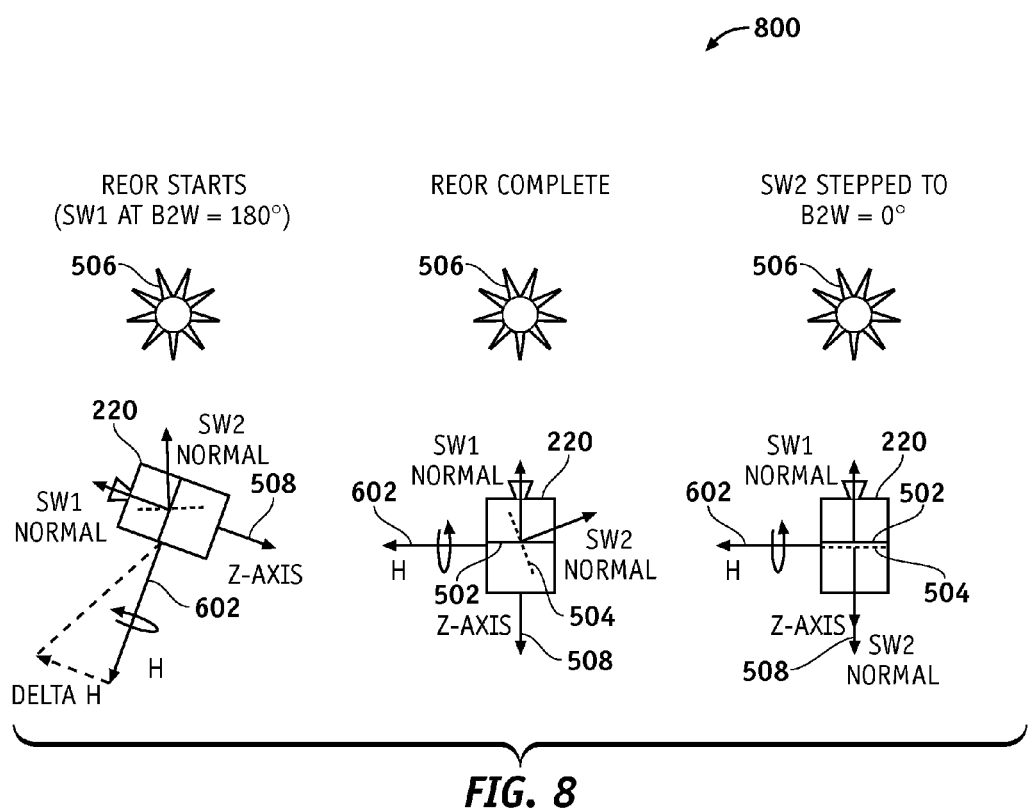
FIG. 8 is an illustration of an exemplary reorientation to deorbit attitude process according to an embodiment of the disclosure.

Substantially immediately prior to reorientation of the spacecraft 220 to the orbit-raising attitude, the ground-based control center 202 commands pulses of the solar wing drives 212 to orient the solar wings 216 so that the normal vector of each solar wing of the solar wings 216 is parallel to the spacecraft Z-axis 508, and therefore parallel to the axial thrusters of the thrusters 224 (FIG. 8); one solar wing is pointed in the +Z direction and one solar wing in the −Z direction. Then, pulses of thrusters of the thrusters 224 which produce torque about an axis which is perpendicular to the X-axis are commanded by the ground-based control center 202 at times which coincide with maxima in telemetered solar wing currents such as the solar wing current peaks 308 (which are monitored by the ground-based control center 202) in order to reorient the spacecraft X-axis 602 (spin axis 602) to the previously described orbit-raising attitude (FIG. 8).

Figure 10:
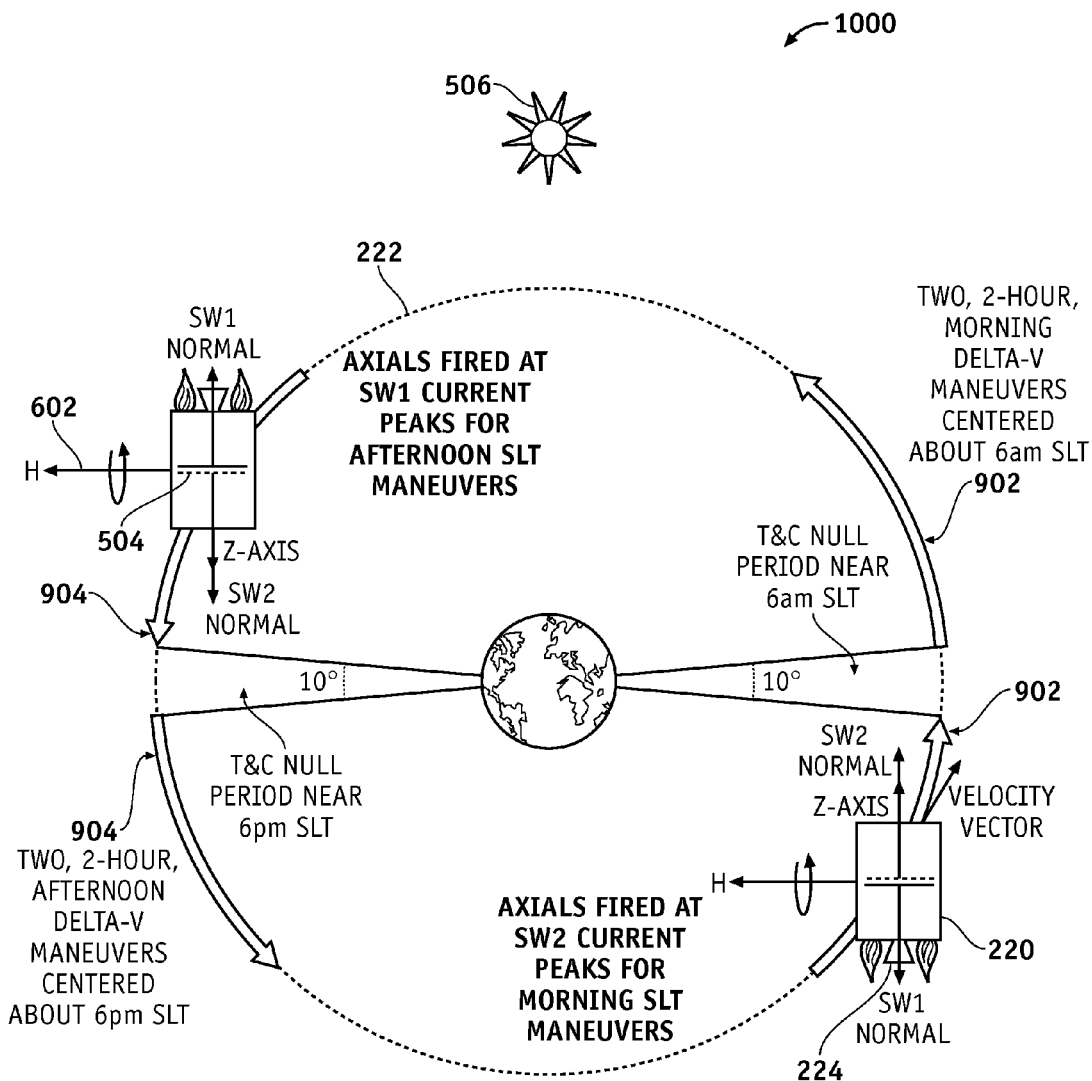
FIG. 10 is an illustration of an exemplary deorbit delta-V maneuver process according to an embodiment of the disclosure.

With the spacecraft 220 in the orbit raising attitude (FIG. 10), the solar wing current peaks 308 (maxima in telemetered solar wing current from the solar wing 216) are used to determine when axial thrusters of the thrusters 224 are pointed at the sun 506 or away from the sun 506 (FIG. 10). While the spacecraft 220 is near spacecraft local dawn (local 6 am), axial thrusters of the thrusters 224 are pulsed each spacecraft rotation, at times centered around a time of the solar wing current peaks 308 from that solar wing of the solar wings 216 which is aligned in an axial thrust direction (spacecraft +Z, FIG. 10).

While the spacecraft 220 is near spacecraft local dusk (local 6 pm), axial thrusters of the thrusters 224 are pulsed centered around a time of solar wing current peaks 308 from the solar wings 216 aligned opposite the axial thrust direction (spacecraft −Z). Thus, delta-V achieved is toward the sun 506 during a portion of the orbit 222 when the sunline 510 is closest to an orbit velocity vector. Delta-V achieved is opposite to the sun 506 during a portion of the orbit 222 when the sunline 510 is nearly opposite to the orbit velocity vector. Thereby, an orbit semi-major axis of the spacecraft orbit 222 is increased in both cases. Use of this method eliminates a need for a costly third spacecraft control processor in order to provide capability to maneuver the spacecraft 220 to a disposal orbit 218 in an event of a dual spacecraft processor failure.

The controller 320 is coupled to the ground-based control center 202 and comprises processing logic that is configured to carry out the functions, techniques, and processing tasks associated with the operation of the systems 200-300. For example, the controller 320 directs the ground-based control center 202 to generate the ground control commands 204 to perform all payload shutdown and de-orbit functions of the system 200-300. For another example, the controller 320 directs the ground-based control center 202 to transmit the ground control commands 204 via a ground station antenna 226 to a spacecraft antenna 228 to be received by the CTCU 206.

The controller 320 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration.

In particular, the processing logic is configured to support the authentication method described herein. For, example the controller 320 may be suitably configured to send and receive signals from an antenna (not shown). Furthermore, the steps of a method or algorithm described in connection with the embodiments disclosed herein may be embodied directly in hardware, in firmware, in a software module executed by the controller 320.

The memory modules 322, may be realized as a non-volatile storage device (non-volatile semiconductor memory, hard disk device, optical disk device, and the like), a random access storage device (for example, SRAM, DRAM), or any other form of storage medium known in the art. The memory module 322 may be coupled to the controller 320 such that the controller 320 can read information from, and write information to, the memory module 322.

As an example, the controller 320 and memory module 322, may reside in their respective ASICs. The memory modules 322 may also be integrated into the controller 320. In an embodiment, the memory module 322 may include a cache memory for storing temporary variables or other intermediate information during execution of instructions to be executed by the controller 320. The memory module 322 may also include non-volatile memory for storing instructions to be executed by the controller 320. For example, the memory modules 322 may store the ground control commands 204 and instructions to be executed by the embedded Command Modules (ECMs) 316/318.

The memory modules 322 may store other data in accordance with an embodiment of the disclosure. For another example, but without limitation, the memory module 322 stores orientation of the spacecraft 220, solar wing current peaks in solar wing current, a timing of reorientation that thruster pulses used, or other data in accordance with embodiments of the disclosure.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 200-300 may comprise any number of processor modules, any number processing modules, any number of memory modules, any number of transmitter modules 328-332, any number of receiver modules, any number of Central Command and Telemetry Units (CTCUs) 310/312/314 any number of embedded Command Modules (ECMs) 316/318, and any number of antenna suitable for their operation described herein. The illustrated system 200-300 depicts a simple embodiment for ease of description. These and other elements of the system 200 or system 300 are interconnected together, allowing communication between the various elements of system 200-300. In one embodiment, these and other elements of the system 200-300 may be interconnected together via a respective data communication bus (not shown).

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Some embodiments of the system 200-300 may comprise additional components and elements configured to support known or conventional operating features that need not be described in detail herein.

Figure 4:
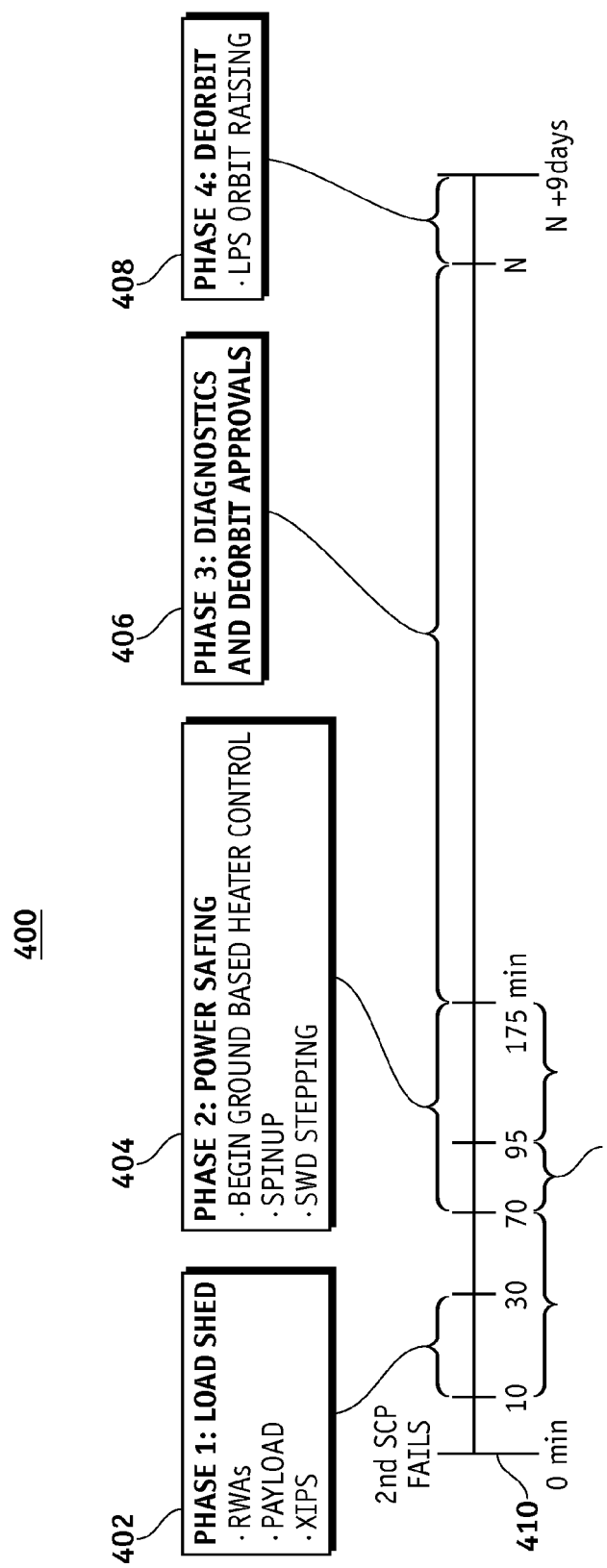
FIG. 4 is an illustration of an exemplary processor-less de-orbiting process according to an embodiment of the disclosure.

FIG. 4 is an illustration of an exemplary processor-less de-orbiting process 400 according to an embodiment of the disclosure. In an embodiment, phases of a de-orbit sequence may comprise: a Static Phase, Pre-Spinup/Load Shed Phase, and Spinup/Safing Phase. In the Static Phase, from time of failure until first ground command (constrained by bounding momentum and power analysis), and payload is on, all heater states in their last commanded configuration, Xenon Ion Propulsion System (XIPS) may be thrusting.

Upon realization of a failure operation scenario, during a Load Shed 402 (Phase I), the ground control commands 204 are received from the ground-based control center 202 by 1 of 3 Central Command and Telemetry Units (CTCUs) 310/312/314 (command receivers) through Omni Antennas (e.g., 226 in FIG. 2). After failure of a second Spacecraft Control Processor (SCP) shown at 0 min 410, the ground-based control center 202 issues the ground control commands 204 to shed major loads from the spacecraft 220 to conserve power. Ground commanded battery charge management and heater control is issued to remain within necessary power/thermal constraints.

In the Pre-Spinup/Load Shed 402 (Phase 1), the ground-based control center 202 first sheds the XIPS, payload, and reaction wheel assemblies (RWAs) and configures battery charge management and heater control as necessary to meet survival constraints. The ground-based control center 202 steps a South Solar Wing Drive (SWD) of the Solar Wing Drives (SWD) 212 to position 180 degrees from a current North Solar Wing Drive (SWD) of the Solar Wing Drives 212 position to ensure at least some solar wing current is generated while the spacecraft 220 is tumbling prior to the start of X-spinup. To ensure the spacecraft 220 achieves a long-term power/thermal safe condition, the Spinup Phase 404 must be started as soon as the gyroscopic stabilization wheels spin-down period has expired and the initial load shed and Solar Wing Drives (SWD) 212 stepping has been completed; ground failure diagnosis should wait until the spacecraft 220 has been spun-up and placed in a safe configuration.

During Spinup/Safing 404 (Phase 2), the ground-based control center 202 commands a sequence of pulses of the thrusters 224 which produce torque primarily about the spacecraft X-axis 602 (which is the spacecraft major axis of inertia) in order to induce a stable spin about this axis. The ground-based control center 202 steps Solar Wing Drive (SWD) 212 to peak power positions after X-spinup is complete in order to maximize power, leaving the spacecraft 220 in a long term power safe condition. The ground-based control center 202 starts manual maintenance heater and battery charge management configuration (changing configuration for eclipse entry, exit, etc.). The spacecraft 220 at this time in a power/thermal safe configuration, and can remain so indefinitely. The ground-based control center 202 starts failure diagnosis and plans de-orbit sequence. If the SCP can be recovered, the spacecraft 220 can be returned to service using normal Flight Software sequences. If the Spacecraft Control Processor (SCP) cannot be recovered, Reorientation Phase is started once de-orbit planning/coordination is complete. Once power/thermal safe, may remain in this phase for multiple days.

During Diagnostics and De-orbit Approvals (Phase 3) 406, the ground-based control center 202 may perform Spacecraft Control Processor (SCP) diagnostics to confirm a failure. Telemetry available through Central Command and Telemetry Units (CTCUs) 310/312/314 which is used to control the spacecraft after the Spacecraft Control Processor (SCP) failure comprise: solar array currents, temperatures, battery cell voltages, Automatic Gain Control (AGC) levels, and latch valve status.

At the beginning of Deorbit/Orbit Raising Phase (Phase 4) 408, the ground-based control center 202 performs re-orientation as previously described to move a spin-axis to an attitude required for de-orbit. In the reorientation phase, the ground-based control center 202 steps Solar Wing Drives (SWD) 212 and pulses thrusters 224 to reorient the spacecraft spin axis 602 (X-axis) to the attitude required for de-orbit delta-V maneuvers so that the spin axis is perpendicular to the sun. Once the spacecraft spin-axis is in the attitude required for deorbit, the ground-based control center 202 performs, for example, two or four maneuvers per day (depending on spacecraft antenna pattern) over several weeks, pulsing axial jets at the sun; this continues until orbital altitude has been increased by about 300 km. Multiple reorientations (reors) may be necessary over the course of De-orbit Phase 408 to keep spin axis perpendicular to the sun 506. Daily orbit raising maneuvers will be periodically suspended over the course of de-orbit maneuver phase to allow ground ranging for orbit determinations to be performed. Once disposal orbit is achieved, the ground-based control center 202 deconfigures and/or disables the Spacecraft Control Processor (SCP), as necessary.

In this example, the de-orbit process starts the Pre-Spinup/Load Shed 402 within about 10 minutes, and spinup in the Spinup/Safing 404 within about 70 minutes after the second SCP fails to achieve high likelihood of successful de-orbi. However several days are available for Diagnostics and De-orbit Approvals 406 prior to the Deorbit/Orbit Raising Phase 408.

In an embodiment of a method to de-orbit, the steps comprise Pre-Spinup Sequence, Spacecraft X-Spinup/Safing, Reorientation to Deorbit Attitude, and Deorbit Delta-V Maneuvers.

FIG. 5 is an illustration of an exemplary pre-spinup safing process 500 according to an embodiment of the disclosure. During a Pre-Spinup Sequence, at Spacecraft Control Processor (SCP) failure, gyroscopic stabilization wheels may spin up or down inducing tumbling (gyroscopic stabilization wheels continue to torque at last commanded value). The ground-based control center 202 manually steps Solar Wing 2 (SW2) 504 to opposite position of Solar Wing 1 (SW1) 502. As the spacecraft 220 tumbles, one Solar Wing should generally see some sun 506 (which is also true for most stationary orientations). Gyroscopic stabilization gyroscopic stabilization wheels (wheels) are powered off and allowed to spindown to take out any excessive rates generated by Spacecraft Control Processor (SCP)-failure-induced wheel spinup.

Goals of the Pre-Spinup Safing process 500 may comprise any or all the following: to take immediate steps to prevent spacecraft system momentum from growing above levels which would prevent successful X-Spinup, take immediate steps to start reducing spacecraft rotation rates and/or wheel momentum to levels which permit successful spinup, so that X-Spinup can be started as soon as possible, and significantly reduce power loads in order to increase the time the spacecraft 220 can survive until a permanent power/thermal safe configuration is achieved.

In one example, these goals are accomplished by one or more of the following: powering off the Xenon Ion Propulsion System (XIPS) to prevent the XIPS induced torques from increasing system momentum beyond acceptable levels for X-Spinup and to reduce power consumption; powering off gyroscopic stabilization wheels to allow them to spin down in order to reduce spacecraft rotation rates and/or wheel momentum to acceptable levels for X-spinup; power off all other loads not necessary for spacecraft spinup and safing (e.g., payload, ACS units) for power conservation; place solar wings in position to minimize probability of draining batteries before X-spinup can occur; and configuration battery charge management and heaters as appropriate for the new condition and to maintain survival conditions.

In one variant, a near immediate response to a second SCP failure by starting the Pre-Spinup Safing sequence is desired to maximize the likelihood of a successful safing sequence. If the XIPS thrusters continue thrusting after the second SCP failure, momentum could quickly grow above levels which permit successful X-spinup and safing. In yet another variant, since wheel torque commands stay at the last value, gyroscopic stabilization wheels could quickly spin up or down to saturation levels, greatly increasing the time necessary to wait for gyroscopic stabilization wheels to spin down to levels required to start X-spinup, and thereby reducing the likelihood that spacecraft will survive until a power/thermal safe configuration is achieved. Without pointing control provided by an SCP, solar wing power generation is not guaranteed and loads not necessary for safing need to be shed quickly to ensure battery state-of-charge (SOC) is sufficient to last through the safing sequence. In one example, a response time of 10 minutes (FIG. 4) has therefore been assumed between failure of the SCP and the start of Pre-Spinup Safing commanding by the ground-based control center 202.

In one example, Pre-Spinup Sequence includes power off gyroscopic stabilization wheels to allow them to spindown. Spinup can only be performed if spacecraft body rates are low and wheel momentum is in an allowable range, therefore need to power off gyroscopic stabilization wheels and wait long enough to guarantee rates and wheel momentum have returned to acceptable levels as gyroscopic stabilization wheels spin down. During step Solar Wing 2 (SW2) 504 to position 180 degrees from Solar wing 1 (SW1) 502 to minimize periods during which neither solar wing is illuminated by the sun 506 during spacecraft drift prior to spinup. As such, this step prevents a situation with the sun 506 on a non-power producing side of both solar wings SW1 502 and SW2 504 for an extended period. In one example, in most cases this should provide acceptable power until spinup can be performed. In another example, a situation (e.g., stable spin or a substantially stationary spacecraft) with wings continuously edge on to sun would be problematic.

Figure 6:
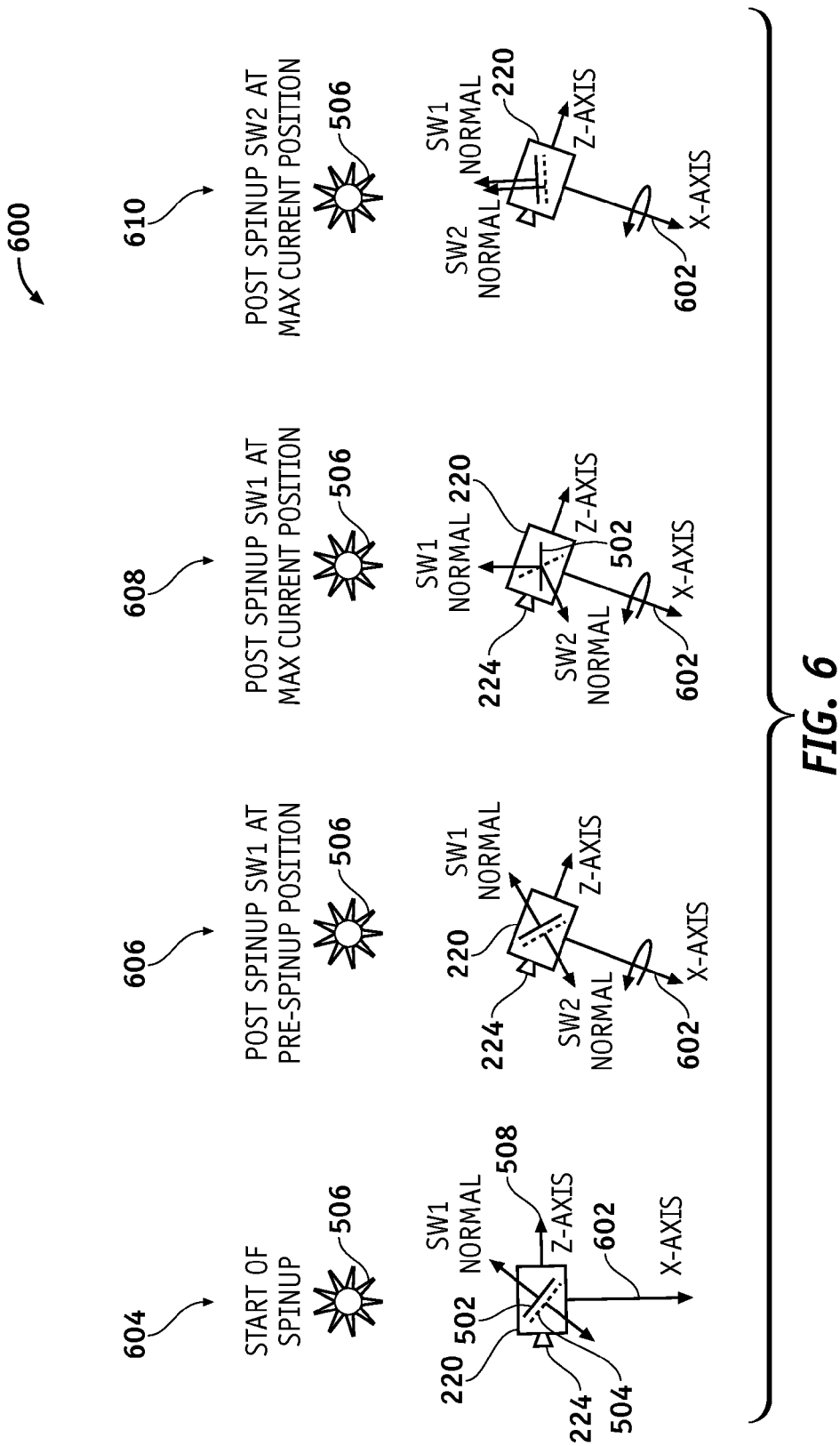
FIG. 6 is an illustration of an exemplary spacecraft x-spinup process according to an embodiment of the disclosure.
Figure 7:
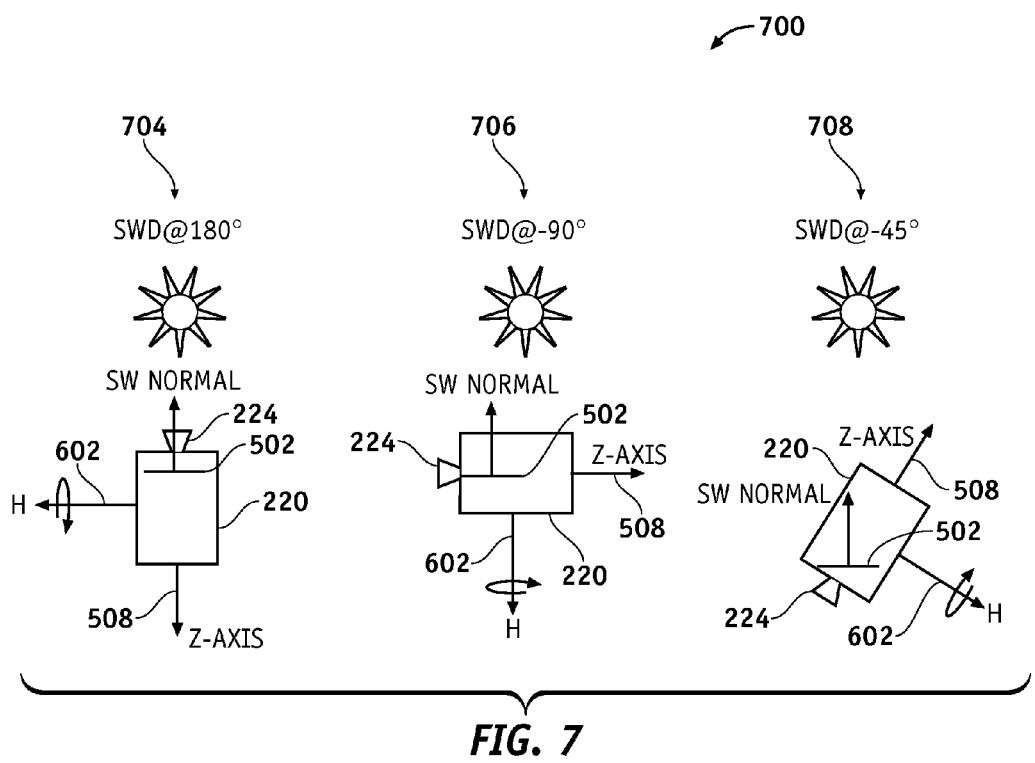
FIG. 7 is an illustration of an expanded view of a spacecraft spinup showing a solar wing at various orientation angles according to an embodiment of the disclosure.

FIG. 6 is an illustration of an exemplary spacecraft X-spinup process 600 showing a start of spinup 604, the SW1 502 at pre-spinup position 606, the SW1 502 at maximum current from the solar wing current peaks 308 position 608, and SW2 504 at maximum current from the solar wing current peaks 308 position 610, according to an embodiment of the disclosure. FIG. 7 is an illustration of an expanded view 700 of three possible spacecraft configurations at a conclusion of the spacecraft spinup process 600 of FIG. 6 showing a solar wing SW1 502/SW2 504 at various orientation 702, 704, and 706 at angles 180 degrees, −90 degrees and, and −45 degrees respectively according to an embodiment of the disclosure. During spacecraft X-Spinup, the spacecraft 220 body rates (e.g., angular acceleration, angular velocity, etc.) and wheel momentum are allowed to decrease to acceptable levels. After waiting for a period of good thrust command communication (Thruster Commanding) coverage, ground manually pulses thrusters 224 to start spin about the spacecraft X-axis 602 (major axis).

After spinup, ground manually steps a solar wing of the solar wings SW1 502/SW2 504 with most sun (largest solar wing current) to an orientation for maximum solar current. A solar wing of the SW1 502/SW2 504 not with most sun of the solar wings is then stepped to the same orientation relative to the spacecraft 220 main body as the first solar wing of the SW1 502/SW2 504 unless the sunline 510 is roughly perpendicular to the spin axis 602, in which case the second solar wing of the SW1 502/SW2 504 is stepped to an orientation 180 deg from the first wing relative to the spacecraft 220 main body.

Bookkeeping of the ground-based control center 202 commanded steps and last known Solar Wing Drives (SWD) 212 position to keep track of SW1 502/SW2 504 orientation angle with respect to the spacecraft main body. At completion, the spin axis 602 may be in any orientation with relation to the sun 506, and the SW1 502/SW2 504 may be at any body-to-wing angle.

A goal of Spinup is to place spacecraft 220 in, for example, an approximate 0.15 revolution per minute (RPM) spin about X-axis 602 with wings SW1 502/SW2 504 positioned to provide maximum spin average power. As such, this spinup places the spacecraft 220 in long term power and thermal safe condition. Spinup start criteria comprises gyroscopic stabilization wheels must be spun down. In one instance, if the spacecraft 220 is rotating too quickly about Y or Z axes 508 (due to wheel spinup induced rates), rotation of body X-axis 602 with respect to the inertial reference frame during spinup results in spinup torque not being applied in a consistent inertial direction which may in turn result in excessive nutation or even no X-spinup. Excessive transverse wheel momentum can also prevent successful spin-up. Additionally, a good communication link must be available long enough to complete all spinup pulses. Operational constraints on spacecraft momentum management and prompt shutdown of the XIPS after the 2nd Spacecraft Control Processor (SCP) failure insure that maximum rates once gyroscopic stabilization wheels have spindown to 0 Revolutions Per Minute (RPM) will not exceed the capability of the X-spinup approach.

FIG. 8 is an illustration of an exemplary reorientation to deorbit attitude process 800 according to an embodiment of the disclosure. During Reorientation (Reor) to de-orbit attitude, the ground-based control center 202 manually steps one Solar Wing (SW1 502) to an orientation with the Solar Wing normal vector (SW1 normal) aligned with either the spacecraft +Z or −Z axis (whichever is closest to the current solar wing orientation). After this is complete, the ground-based control center 202 determines a time of solar array current peaks such as the solar wing current peaks 308. The ground-based control center 202 calculates rotation period at each new peak, and uses this period to automatically determine times to command thruster pulses centered around the next current peak and around the current peak +180 degrees position.

Using these times, the ground-based control center 202 commands pulses of the thrusters 224, which produce a torque (rate of change (delta-H)) of angular momentum H of the spacecraft 220) in a direction perpendicular to the spin axis 602 (X-axis) synchronized with solar wing current peaks 308 (peaks in telemetered current) from the first Solar Wing (SW1 502) in order to reorient spin axis until SW1 502 current peak levels reach a maximum, which indicates that the spin axis is perpendicular to sunline 510. The ground-based control center 202 then manually steps the second Solar Wing (SW2 504) to an orientation relative to the spacecraft 220 main body (body to wing (B2W)), which is 180 degrees opposite the SW1 502. The ground-based control center 202 will need to monitor the ground station aspect angle through the sequence and stop commanding to wait out any communication nulls that may be encountered which would prevent thruster pulse commands from reaching the spacecraft (orbit rate will eventually bring spacecraft back into good coverage).

A goal of reorientation (Reor) comprises reorienting the spin axis and solar wings 216 to attitude required for de-orbit maneuvers; with the spin axis 602 (spacecraft X-axis 602) approximately perpendicular to the sun line 510; and the solar wings 216 along the spacecraft +Z and −Z axes. This orientation aligns the solar wing normal vectors with the thrust vectors of axial thrusters of the thrusters 224 while maintaining a power/thermal safe condition. In other words, this orientation allows delta-V pointed either at or away from the sun 506 to be achieved by timing thruster pulses off of solar wing current peaks 308 of the appropriate solar wing 216.

Reorientation start criteria may comprise achieving nutation at acceptable levels. The ability to determine the spin axis attitude for max solar current diminishes with increased nutation, thereby decreasing pointing accuracy of delta-V maneuvers. In one example, large nutation may be due to large rates transverse to X-axis 602 prior to spinup. In another example, in high nutation cases it may therefore be desirable to wait in the post-spinup power and/or thermal safe attitude to allow nutation to damp out prior to performing reorientation.

In this sequence, step SW1 502 to 0 or 180 degrees (by counting steps), whichever is closest. Leave SW2 504 at current orientation. SW1 502 will be used to determine when reorientation is complete—when a current from the SW1 502 reaches maximum from among the solar wing current peaks 308, the spin axis 602 will be at desired orientation. Furthermore, leaving SW1 502 at initial position insures adequate power throughout reorientation. In one instance, SWD1 502 provides power at start, SWD1 502 provides power at end. In yet another instance, sequence could be split into two reorientations to reduce drop in spin average current during the reorientation.

Figure 9:
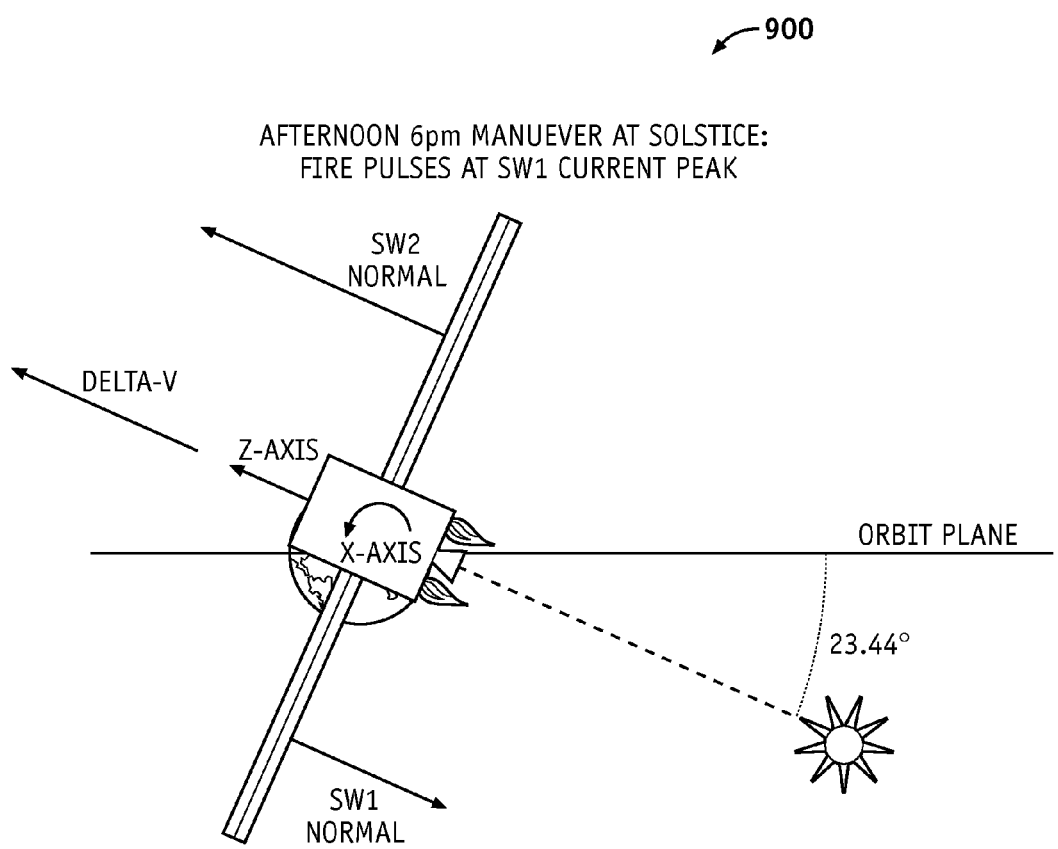
FIG. 9 is an illustration of an afternoon 6 pm maneuver at a solstice according to an embodiment of the disclosure.

FIG. 9 is an illustration of an afternoon 6 pm maneuver at a solstice according to an embodiment of the disclosure. FIG. 10 is an illustration of an exemplary deorbit delta-V maneuver process 900 according to an embodiment of the disclosure. FIG. 11 is an illustration of a morning 6 am maneuver at a solstice a according to an embodiment of the disclosure.

The ground-based control center 202 calculates a rotation period at each new peak, and uses this period to automatically determine times to command thruster pulses centered around the next current peak. During De-orbit Delta-V maneuvers, for Delta-V toward sun, ground manually pulses axial thrusters at SW2 current peak. For Delta-V in a direction opposite the sun 506, the ground-based control center 202 manually pulses axial thrusters at SW1 502 current peak 308. Maneuvers performed during portion of the orbit 222 when delta-V direction is closest to the velocity vector.

Therefore, for sun pointed maneuvers, maneuvers are centered about spacecraft local 6 am, and for anti-sun pointed maneuvers, maneuvers are centered about spacecraft local 6 pm. Depending on the spacecraft antenna configuration, communication nulls (telemetry and control (T&C, FIG. 10) nulls of the CTCU 206) may exist which prevent commanding during portions of the indicated maneuver period. In a further step, the steps above may repeat daily (as allowed by hinders and ranging requirements) until perigee altitude is, for example, greater than about 300 km above Geosynchronous Orbit (GEO). In one alternative, the sequence may include fire axial spinup pulses as required to maintain spin speed (one pulse pair every couple of days) and reorientations as required to maintain spin axis perpendicular to the sun 506.

A goal of de-orbit maneuver may comprise applying delta-V (change in velocity) in the sun direction or anti-sun direction when the sunline 510 is closest to the spacecraft velocity vector in order to raise orbit. In one example, de-orbit maneuver start criteria comprises: spacecraft spin axis 602 substantially perpendicular to the sun 506 and SW1 502/SW2 504 at about 0 and about 180 degree body-to-wing angle; nutation at acceptable levels: in one example, variation in time between SW1 502/SW2 504 current peaks 308 increases with increasing nutation—accuracy in centering of delta-V pulses about the current peaks 308 decreases as a result, and yet another example, increased cosine losses and decrease in orbit knowledge accuracy as nutation increases.

Around solstices, the sun 506 pointed delta-V will point on average 23.4 degrees out of orbit plane 1106 (FIG. 11). For example, around solstices will result in inclination change, about 9% cosine loss for orbit raising.

In one exemplary embodiment, a process of de-orbit maneuver thruster may comprise firing using ground control calculated, solar wing current peaks 308 based pulse modulation. For example, two 640 ms axial pulses may be used per spin period, separated by 60 seconds. Alternately, four pulses may be used per spin period with 30 s spacing sun.

Figure 12:
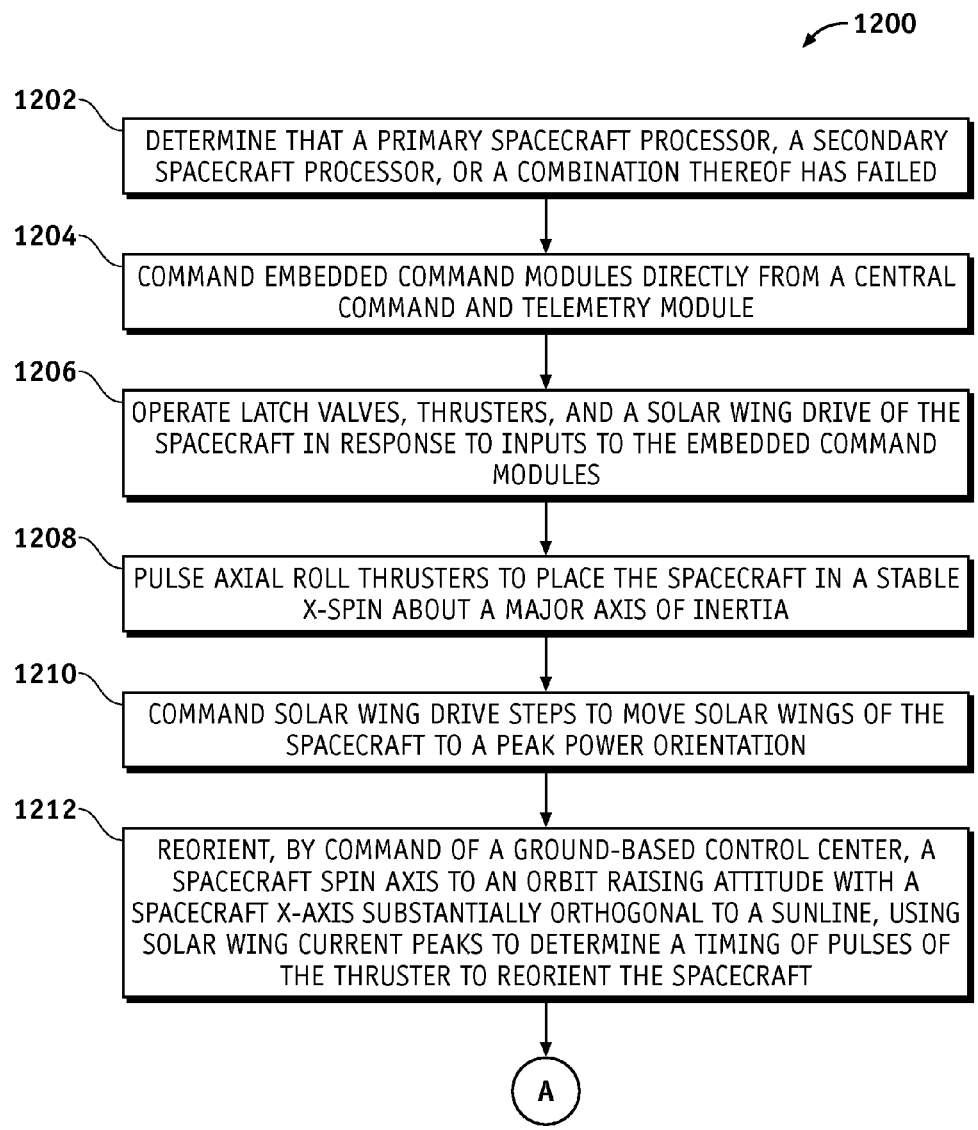
FIG. 12 is an illustration of an exemplary flowchart showing a processor-less de-orbiting process according to an embodiment of the disclosure.
Figure 12:
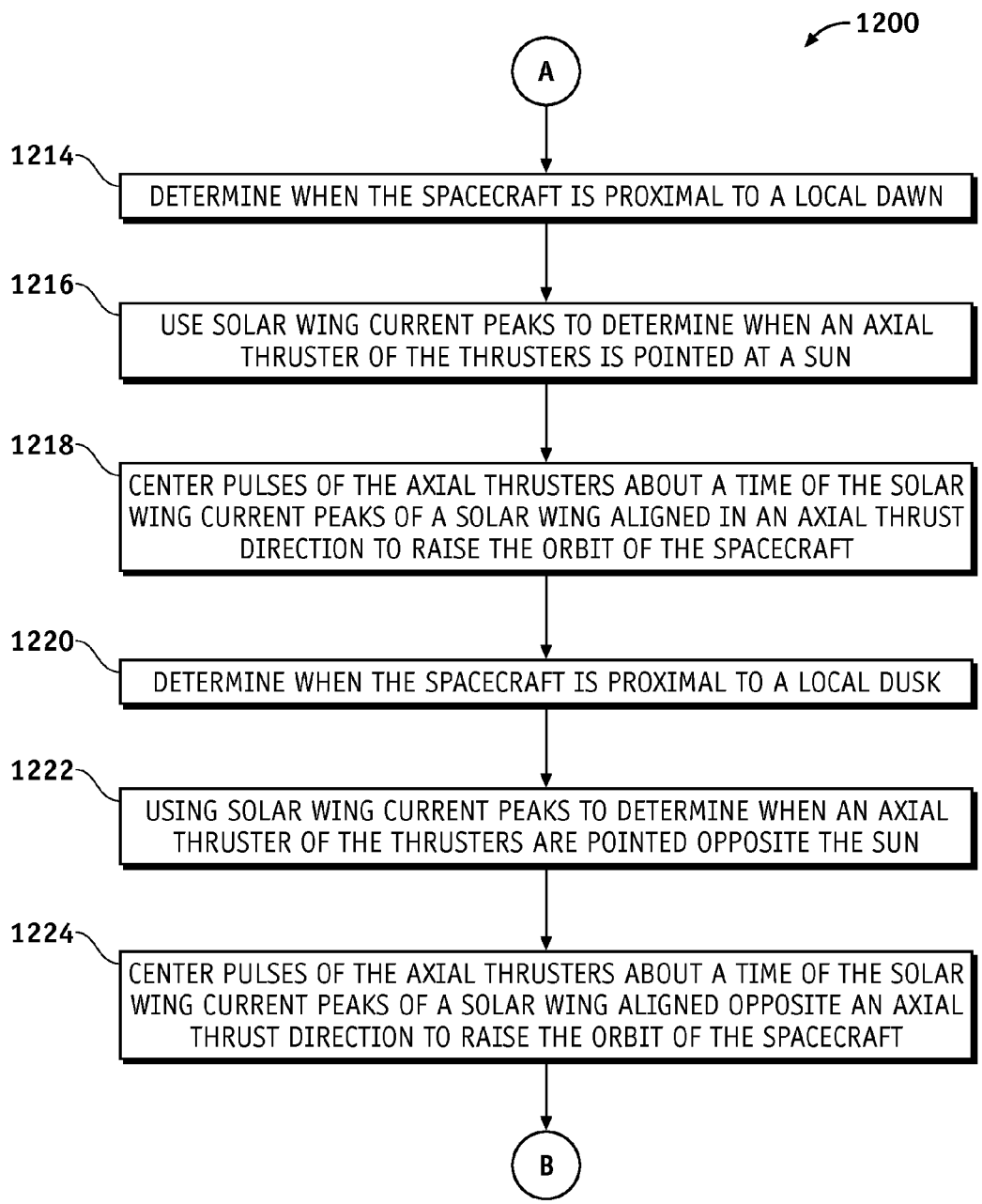
Figure 12:
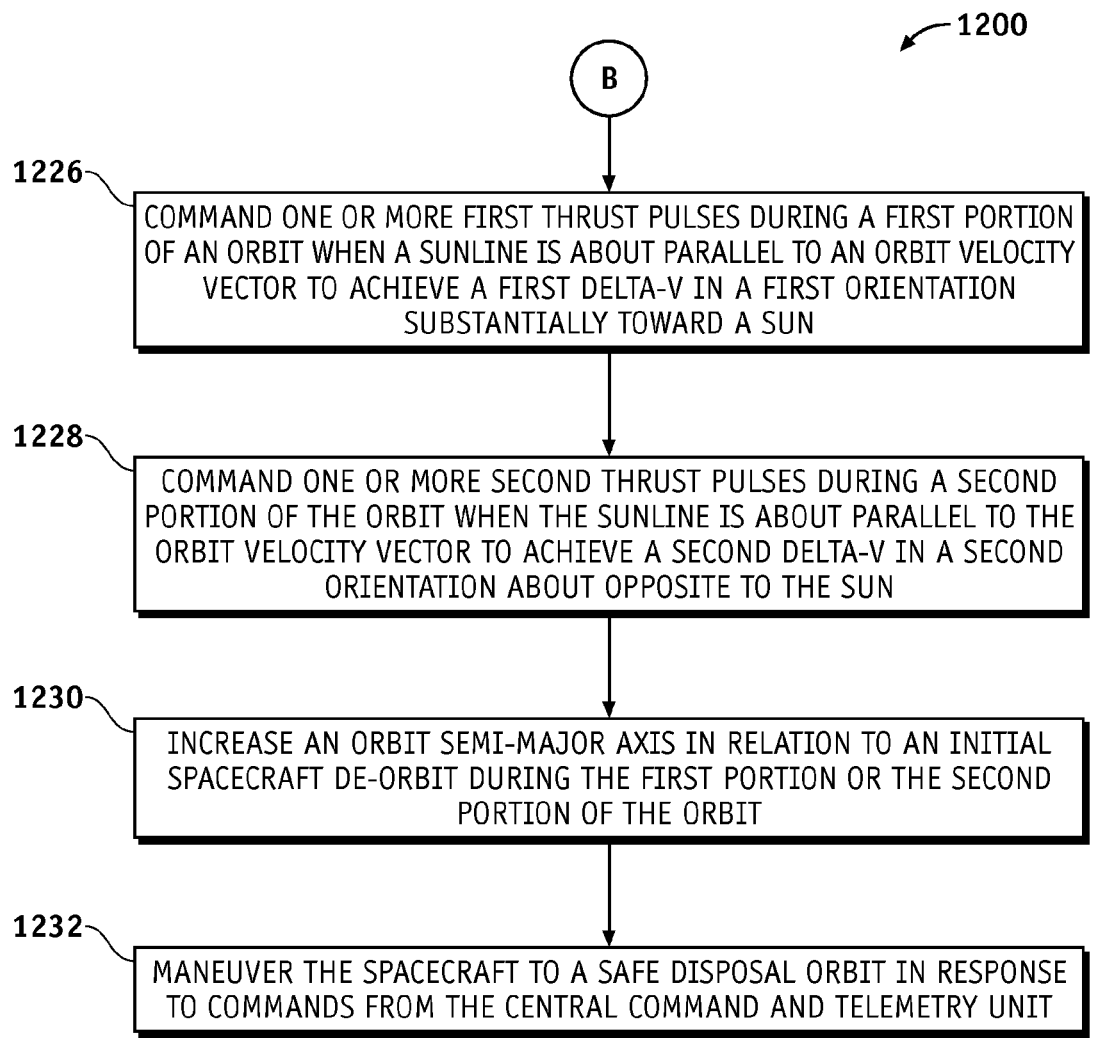

FIG. 12 is an illustration of an exemplary flowchart showing a processor-less de-orbiting process 1200 according to an embodiment of the disclosure. The various tasks performed in connection with the process 1200 may be performed by software, hardware, firmware, a computer-readable medium having computer executable instructions for performing the process method, or any combination thereof. The process 1200 may be recorded in a computer-readable medium such as a semiconductor memory, a magnetic disk, an optical disk, and the like, and can be accessed and executed, for example, by a computer CPU such as the controller 302 used in the ground-based control center 202.

It should be appreciated that process 1200 may include any number of additional or alternative tasks, the tasks shown in FIG. 12 need not be performed in the illustrated order, and process 1200 may be incorporated into a more comprehensive procedure or process having additional functionality not described in detail herein. In some embodiments, portions of the process 1200 may be performed by different elements of the systems 200-300 such as: Central Command and Telemetry Unit (CTCU) 206, the Embedded Command Modules (ECMs) 208, the latch valves 210, the Solar Wing Drives 212, the thruster valves 214, etc. Process 1200 may have functions, material, and structures that are similar to the embodiments shown in FIGS. 2-11. Therefore common features, functions, and elements may not be redundantly described here.

Process 1200 may begin by determining that a primary spacecraft processor such as the spacecraft processor 230, a secondary spacecraft processor such as the spacecraft processor 230 or a combination thereof has failed (task 1202).

Process 1200 may continue by commanding embedded command modules such as the embedded command modules 208 directly from a central command and telemetry module such as the central command and telemetry module 206 (task 1204).

Process 1200 may continue by operating latch valves such as the latch valves 210, thrusters such as the thrusters 224, and a solar wing drive such as the a solar wing drive from the solar wing drives 212 of a spacecraft such as the spacecraft 220 in response to inputs to the embedded command modules 208 (task 1206).

Process 1200 may continue by pulsing of axial roll thrusters of the thrusters 224 to place the spacecraft 220 in a stable x-spin about a major axis of inertia such as the x-spin axis 602 (task 1208).

Process 1200 may continue by commanding solar wing drive steps to move solar wings such as the solar wings 216 of the spacecraft 220 to a peak power orientation such as the solar wing current peaks 308 (task 1210).

Process 1200 may continue by reorienting, by command of a ground-based control center such as the ground-based control center 202, a spacecraft spin axis to an orbit raising attitude with the spacecraft x-axis 602 substantially orthogonal to a sunline such as the sunline 512, using the solar wing current peaks 308 to determine a timing of pulses of the thruster 224 to reorient the spacecraft 220 (task 1212).

Process 1200 may continue by determining when the spacecraft 220 is proximal to a local dawn (task 1214).

Process 1200 may continue by using the solar wing current peaks 308 to determine when an axial thruster of the thrusters 224 is pointed at a sun such as the sun 506 (task 1216).

Process 1200 may continue by centering pulses of the axial thrusters about a time of the solar wing current peaks 308 of a solar wing aligned in an axial thrust direction to raise the orbit of the spacecraft 220 (task 1218).

Process 1200 may continue by determining when the spacecraft 220 is proximal to a local dusk such as the local 6 pm (task 1220).

Process 1200 may continue by using solar wing current peaks 308 to determine when an axial thruster of the thrusters 224 is pointed opposite the sun 506 (task 1222).

Process 1200 may continue by centering pulses of the axial thrusters about a time of the solar wing current peaks 308 of a solar wing aligned opposite an axial thrust direction to raise the orbit of the spacecraft 220 (task 1224).

Process 1200 may continue by commanding one or more first thrust pulses during a first portion of an orbit when the sunline 512 is about parallel to an orbit velocity vector to achieve a first delta-v in a first orientation substantially toward a sun (task 1226).

Process 1200 may continue by commanding one or more second thrust pulses during a second portion of the orbit when the sunline 512 is about parallel to the orbit velocity vector to achieve a second delta-v in a second orientation about opposite to the sun 506 (task 1228).

Process 1200 may continue by increasing an orbit semi-major axis in relation to an initial spacecraft de-orbit during either the first portion or the second portion of the orbit 222 (task 1230).

Process 1200 may continue by maneuvering the spacecraft 220 to a safe disposal orbit such as the orbit 218 in response to commands from the central command and telemetry unit 206 (task 1232).

In this manner, embodiments of the disclosure provide a system and method for manually safing and deorbiting a geostationary spacecraft in an absence of a spacecraft processor.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by controller 320 cause the controller 320 to perform specified operations respectively. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-3, depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method, comprising:
    commanding a plurality of embedded command modules of a spacecraft directly from a central command and telemetry unit;
    operating latch valves, one or more thrusters, and a solar wing drive of the spacecraft in response to inputs to the plurality of embedded command modules; and
    maneuvering the spacecraft to a safe disposal orbit in response to commands from the central command and telemetry unit, comprising:
        commanding the solar wing drive to move one or more solar wings to a peak power orientation;
        orienting the spacecraft to an orbit-raising attitude to orient a spacecraft x-axis or a spacecraft spin axis substantially orthogonal to a sunline; and
        firing one or more sun pointed thrusters of the one or more thrusters to raise an orbit of the spacecraft.

2. The method of claim 1, wherein commanding the plurality of embedded command modules comprises commanding the embedded command modules from a ground-based control center through the central command and telemetry unit.

3. The method of claim 1, further comprising determining that a primary spacecraft processor, a secondary spacecraft processor or a combination thereof has failed.

4. The method of claim 1, further comprising pulsing one or more axial roll thrusters of the one or more thrusters to place the spacecraft in a stable spin about a major axis of inertia.

5. The method of claim 1, further comprising commanding solar wing drive steps to move the one or more solar wings of the spacecraft to a peak power orientation.

6. The method of claim 1, wherein orienting the spacecraft comprises:
    receiving one or more commands; and
    after receiving the one or more commands, reorienting the spacecraft spin axis to an orbit raising attitude with the spacecraft x-axis substantially orthogonal to the sunline, using solar wing current peaks to determine a timing of pulses of the one or more thrusters.

7. The method of claim 1, further comprising using solar wing current peaks to determine when one or more axial thrusters of the one or more thrusters is pointed at a sun or opposite the sun.

8. The method of claim 7, further comprising:
    determining whether the spacecraft is proximal to a local dawn;
    after determining that the spacecraft is proximal to the local dawn, determining a first time when a solar wing current peak of a solar wing of the one or more solar wings that is aligned in an axial thrust direction to raise an orbit of the spacecraft; and
    pulsing the one or more axial thrusters in an axial thrust direction at a time based on the first time.

9. The method of claim 7, further comprising:
    determining whether the spacecraft is proximal to a local dusk;
    after determining that the spacecraft is proximal to a local dusk, determining a second time of a solar wing current peak of a solar wing of the one or more solar wings that is aligned in second axial thrust direction opposite an axial thrust direction to raise an orbit of the spacecraft; and
    pulsing the one or more axial thrusters in the second axial thrust direction at a time based on the second time.

10. The method of claim 7, further comprising:
    commanding one or more first thrust pulses during a first portion of an orbit when the sunline is about parallel to an orbit velocity vector to achieve a first delta-v in a first orientation substantially toward the sun;
    commanding one or more second thrust pulses during a second portion of the orbit when the sunline is about parallel to the orbit velocity vector to achieve a second delta-v in a second orientation about opposite to the sun; and increasing an orbit semi-major axis in relation to an initial spacecraft de-orbit during the first portion or the second portion of the orbit.

11. A system, comprising:
one or more solar wings;
one or more thrusters;
a plurality of embedded command modules operable to be commanded directly from a central command and telemetry unit, wherein the plurality of embedded command modules are configured to:
  command a solar wing drive to move the one or more solar wings to a peak power orientation;
  orient the spacecraft to an orbit-raising attitude to orient a spacecraft x-axis or a spacecraft spin axis substantially orthogonal to a sunline; and
  fire one or more sun pointed thrusters of the one or more thrusters to raise an orbit of the spacecraft; and
a plurality of spacecraft devices responsive to inputs from the embedded command modules, the plurality of spacecraft devices comprising one or more latch valves, one or more thruster valves, and the solar wing drive.

12. The system of claim 11, wherein the plurality of embedded command modules are operable to be commanded from a ground-based control center through the central command and telemetry unit.

13. The system of claim 11, wherein the central command and telemetry unit is further operable to determine that a primary spacecraft processor, a secondary spacecraft processor or a combination thereof has a failure and directly command the plurality of embedded command modules via a ground-based control center in response to the failure.

14. The system of claim 11, wherein one or more axial roll thrusters of the one or more thrusters is operable to be pulsed by a command of the plurality of embedded command modules to place the spacecraft in a stable spin about a major axis of inertia.

15. The system of claim 11, wherein the embedded command modules are operable to orient the spacecraft by at least:
  receiving one or more commands; and
  after receiving the one or more commands, reorienting the spacecraft spin axis to an orbit raising attitude with the spacecraft x-axis substantially orthogonal to the sunline, using solar wing current peaks to determine a timing of pulses of the one or more thrusters.

16. The system of claim 11, wherein solar wing current peaks are utilized to determine a timing of reorientation that thruster pulses of the spacecraft used to achieve the orbit-raising attitude.

17. The system of claim 11, further comprising one or more axial thrusters of the one or more thrusters configured to operate based on solar wing current peaks when the axial thrusters are pointed at a sun or opposite the sun.

18. The system of claim 17, wherein the central command and telemetry unit is further operable to:
  determine whether the spacecraft is proximal to a local dawn;
  after determining that the spacecraft is proximal to the local dawn, determine a first time when a solar wing current peak of a solar wing of the one or more solar wings that is aligned in a first axial thrust direction to raise an orbit of the spacecraft; and
  pulse the one or more axial thrusters in the first axial thrust direction at a time based on the first time.

19. The system of claim 17, wherein the central command and telemetry unit is further operable to:
  determine whether the spacecraft is proximal to a local dusk;
  after determining that the spacecraft is proximal to a local dusk, determining a second time when a solar wing current peak of a solar wing of the one or more solar wings that is aligned in a second axial thrust direction opposite an axial thrust direction to raise an orbit of the spacecraft; and
  pulse the one or more axial thrusters in the second axial thrust direction at a time based on the second time.

20. The system of claim 17, wherein the central command and telemetry unit is further operable to:
  command one or more first thrust pulses during a first portion of an orbit when the sunline is about parallel to an orbit velocity vector to achieve a first delta-v in a first orientation substantially toward the sun,
  command one or more second thrust pulses during a second portion of the orbit when the sunline is about parallel to the orbit velocity vector to achieve a second delta-v in a second orientation about opposite to the sun, and
  increase an orbit semi-major axis in relation to an initial spacecraft de-orbit during either the first portion or the second portion of the orbit.

* * * * *